(12) United States Patent
Nassor et al.

(10) Patent No.: US 8,582,664 B2
(45) Date of Patent: Nov. 12, 2013

(54) METHOD AND DEVICE FOR CREATING A VIDEO SEQUENCE REPRESENTATIVE OF A DIGITAL VIDEO SEQUENCE AND ASSOCIATED METHODS AND DEVICES FOR TRANSMITTING AND RECEIVING VIDEO DATA

(75) Inventors: Eric Nassor, Thorigne Fouillard (FR); Karine Renout, Betton (FR)

(73) Assignee: Canon Research Centre France, Cesson-Sevigne (FR)

( * ) Notice: Subject to any disclaimer, the term of this patent is extended or adjusted under 35 U.S.C. 154(b) by 1787 days.

(21) Appl. No.: 11/599,320

(22) Filed: Nov. 15, 2006

(65) Prior Publication Data

US 2007/0110169 A1    May 17, 2007

(30) Foreign Application Priority Data

Nov. 16, 2005  (FR) ...................................... 05 11616

(51) Int. Cl.
  *G06F 17/30* (2006.01)
  *H04N 21/23* (2011.01)
(52) U.S. Cl.
  USPC .......................... 375/240.26; 725/87; 709/217
(58) Field of Classification Search
  USPC ............. 375/240.01–240.29, 240.26, E7.024; 348/12, E7.071; 725/87, 91, 93, 88; 709/217, 218, 219; 715/749, 720, 838; 707/103; G9B/27.012, 21.019, 27.021, G9B/27.05; 345/339
  IPC ....................................................... H04N 7/12
  See application file for complete search history.

(56) References Cited

U.S. PATENT DOCUMENTS

| | | | | |
|---|---|---|---|---|
| 5,612,900 A | * | 3/1997 | Azadegan et al. | ............ 709/247 |
| 6,166,735 A | * | 12/2000 | Dom et al. | .................... 715/749 |
| 6,711,741 B2 | * | 3/2004 | Yeo | ................................ 725/87 |
| 6,785,338 B1 | * | 8/2004 | Reitmeier et al. | ....... 375/240.29 |

(Continued)

FOREIGN PATENT DOCUMENTS

| | | | |
|---|---|---|---|
| EP | 1170943 | * | 1/2002 |
| EP | 1170943 A1 | * | 1/2002 |
| WO | 97/30551 | | 8/1997 |
| WO | 2005/017899 | | 2/2005 |

OTHER PUBLICATIONS

Mark Henderson, Benefits and Consequences of Peer-to-Peer File Sharing, Spring 2004, pp. 1 and 2.*

(Continued)

*Primary Examiner* — Jay Au Patel
*Assistant Examiner* — Reza Aghevli
(74) *Attorney, Agent, or Firm* — Fitzpatrick, Cella, Harper & Scinto

(57) ABSTRACT

Creation of a video sequence representative of a digital video sequence, wherein the digital video sequence is divided into a plurality video sections. For at least one of the video sections of the digital video sequence, at least one video portion of the video section is selected, a video segment is determined comprising the at least one selected video portion, at least one item of identification information is associated with the determined video segment for identification of the corresponding video section, at least one item of location information is also associated with the determined video segment for location within the digital video sequence of the at least one video portion included in the segment, and the determined segment is inserted in the video sequence representative of the digital video sequence.

42 Claims, 10 Drawing Sheets

(56) References Cited

U.S. PATENT DOCUMENTS

| | | | |
|---|---|---|---|
| 7,814,520 B2* | 10/2010 | Guedalia | 725/90 |
| 2004/0015995 A1 | 1/2004 | Shao et al. | 725/87 |
| 2005/0105811 A1* | 5/2005 | Van Eggelen | 382/239 |
| 2006/0064716 A1* | 3/2006 | Sull et al. | 725/37 |

OTHER PUBLICATIONS

Dapeng Wu, Streaming Video over the Internet: Approaches and Directions, Mar. 2001, IEEE, p. 283.*

Wu et al, "Streaming Video over the Internet," IEEE Trans. on Circuits and Systems for Video Technology, vo. 11, No. 3, Mar. 2001, pp. 282-300.*

R. Lienhart, et al., "Video Abstracting", Communications of the ACM, Dec. 1997, vol. 40, No. 12, pp. 55-62.

T. Boudier, et al., "VIDOS, a system for video editing and format conversion over the Internet", Computer Networks, (2000) vol. 34, pp. 931-944.

* cited by examiner

METHOD AND DEVICE FOR CREATING A VIDEO SEQUENCE REPRESENTATIVE OF A DIGITAL VIDEO SEQUENCE AND ASSOCIATED METHODS AND DEVICES FOR TRANSMITTING AND RECEIVING VIDEO DATA

FIELD OF THE INVENTION

The invention concerns a method and device for creating a video sequence representative of a digital video sequence, methods and devices for transmitting video data of a digital video sequence as well as a method and device for receiving video data of a digital video sequence.

The present invention generally concerns the processing and segmenting of a video sequence, as well as the transmission and reception of video data of a video sequence by adapting the coding of the data, and by reducing the use of the bandwidth.

A favored but not exclusive application of the present invention that is particularly worthwhile is the storage and the access to multimedia digital data in a distributed communication network of client-server or peer-to-peer type.

BACKGROUND OF THE INVENTION

In a communication network of distributed type, provision is made for sharing digital data, such as audio files, video sequences, images, animations, etc. between several communication apparatuses connected to the network.

For example, in so-called peer-to-peer communication systems, it is allowed to have large spaces for storage of data and to exchange multimedia data of large size.

It should be noted that, in a distributed network of peer-to-peer type, such as the Internet network, the communication apparatuses connected, which are for example computers, may be considered either as clients, in which case they are adapted to receive data, or as servers, in which case they adapted to provide data to other apparatuses of the network.

However, in such a network, the apparatuses are not connected permanently to the network, which means that all the data are not accessible at every instant.

Furthermore, at each new connection, the address on the network of the apparatuses may change. Thus the problem of finding the apparatuses arises.

One solution to this problem consists of having recourse to a server, termed central server, of which the role is to ensure a minimum quality of service. To do this, the server may store in memory, in particular in a temporary memory of cache memory type, a portion of the data exchanged between the different apparatuses of the communication network so as to enable access to those data if no communication apparatus suitable for delivering those data is connected to the network.

Such a network is then termed a hybrid peer to peer system.

The transmission of data, in particular multimedia data such as video, involves the transmission of large quantities of data. For this, the use of the bandwidth and of the storage resources must be optimized.

One approach consists of exploiting the different coding formats available so as to code the multimedia data while providing the best possible quality and a minimum quantity of data.

Among the different video communication formats is the MPEG1 standard used in particular for coding and storing videos on a carrier of CD type, the MPEG2 used in particular to code and store videos on a carrier of DVD type or for coding digital television broadcast by satellite. Finally, the MPEG4 standard makes it possible to code video in formats that are very widespread on the Internet such as DivX and Xvid.

Other standards are also in course of standardization, such as the H264 and SVC standards making it possible to further improve the rates of compression obtained by the MPEG4 standard by a factor of 1.5 to 2, while at the same time providing a better display quality.

However, when an item of data is not present in a format adapted to be transmitted, the change in format needing to be carried out necessitates a long coding time.

Conventionally, coding of multimedia data is considered as fast, but on a video of one hour this represents an hour of conversion which is too long to be carried out during the communication steps.

Thus, such coding making possible a change in format is incompatible with a need to rapidly provide a representation of the original content of the multimedia data.

In conventional data sharing systems, all the data is loaded onto the communication apparatus which requires the data, that is to say the recipient communication apparatus. Once the loading of the data has been carried out, these latter become available both for being made accessible to the other terminals of the network in the peer-to-peer network, and for being viewed by the user.

In the case of loading video data, the size of those data is such that the downloading time is incompatible with an interactive use of those data.

Thus, the user is obliged to launch the downloading of the data and then wait for several hours for all the data to be downloaded and stored in order to view the video sequence at last.

Another approach consists of viewing a streamed video sequence in real time. With this mechanism, the user loads and views the video data without however storing those data. This solution however has the advantage of minimizing the waiting time of the user.

According to this approach, the client only receives a portion of the data in order to display them, but not the entirety of the information. This is because certain portions may be lost during the transmission to the user without them however being resent. To adapt the transmission of the video to the available bandwidth, the latter is modified by reducing the quality, or the resolution or by deleting certain images. On account of this, it is not possible to store those data and to make them available to the other users.

Such a system is adapted to interactive applications but it is not adapted to the downloading and storage of the data in a peer-to-peer type network.

These approaches also have another drawback. This is because they do not give the user the possibility of rapidly identifying portions of the content of the video data which are of interest to that user.

Thus, the user is obliged to view the whole of the video sequence to identify the portions which he wishes especially to access.

Thus, the main problem lies in the absence of a system making it possible to rapidly transmit and exchange, between terminals of a peer-to-peer type network, multimedia content or portions of multimedia content of video sequence type, while ensuring the best possible video quality, that multimedia content being constituted by large quantities of data.

Moreover, to that problem there is added that of avoiding the duplication of multimedia content at the time of the transmissions between the communication apparatuses of the peer-to-peer network in order to save bandwidth.

Numerous studies have been conducted over several years with the object of minimizing the impact of the transmission and of the loading of video sequences and thus on the access by the users to those video sequences.

There is known, in particular, from U.S. Pat. No. 6,166,735 of International Business Machines Corporation (IBM), a system in which multimedia content, and more particularly videos, may be downloaded selectively onto a client communication apparatus, from a remote communication apparatus, the server. This is a client-server system.

This system enables the user to download, then view representation points of the original stream identifying sections of the video sequence. Each representation point is shown by a thumbnail image illustrating the section of the video sequence. On selecting one or more representation points, the user may thus obtain and rapidly access the section of the original video sequence identified by selected representation points.

However, the user only has slight information for cognition of the content of the video section corresponding to the thumbnail image, and this system only partially solves the problem of transmission and of reduction of the bandwidth.

Thus, these methods have the drawback of both not transmitting multimedia data rapidly and not optimizing the use of the bandwidth on the network.

It would consequently be desirable to be able to reduce the quantity of information transmitted, in particular by making an appropriate selection of the information to transmit.

SUMMARY OF THE INVENTION

The present invention firstly relates to providing a method of creating a video sequence representative of a digital video sequence, comprising the following steps:
dividing the digital video sequence into a plurality of video sections,
for at least one of said video sections of the digital video sequence:
selecting at least one video portion of the video section,
determining a video segment comprising said at least one selected video portion,
associating with the determined video segment at least one item of location information for location within the digital video sequence of said at least one video portion included in the segment, and
adding the determined segment to the video sequence representative of the digital video sequence.

This new method of creating a video sequence representative of a digital video sequence is, in particular, based on the generation of a representation of small size of the content of the initial digital video sequence.

This generation is in particular carried out by dividing the content of the video sequence and by selecting a video segment in at least one of the sections created at the time of dividing the video sequence, it being possible for the segments to be composed by a plurality of segments in the section.

An item of information for location in the video sequence is associated with each of these segments, it being possible for the location to be determined with respect to the start of the video sequence or with respect to the start of the video section.

Such a representation of the digital video sequence may thus both be transmitted over a communication network without requiring a wide bandwidth and be stored without requiring a lot of memory space.

Furthermore, this representation enables a user to have rapid access to the sections he really desires to view. This is because only the sections that are desirable to the user are generated, sent over the network and stored with the user.

The selected sections will not, in particular, be sent in their entirety but only complementary portions, that is to say that are not inserted into the representative video sequence, as also specified below. These complementary portions are defined using location information associated with the segment present in the representative video sequence.

According to a possible feature, at least one item of identification information for identification of the selected video section is associated with the video segment.

According to a possible feature, the digital video sequence being coded in a differential coding format, said digital video sequence comprising a plurality of groups of pictures (GOPs), each group being adapted to be decoded independently, selecting a video portion comprises the following steps:
selecting a portion of the video from the video section,
modifying the start and end of the selected portion in order to include a whole number of groups of pictures (GOPs).

This is because the limits of the video portions coded in a differential coding format must be aligned so as not to cut Groups Of Pictures.

According to another possible feature, prior to the step of adding the segment to the video sequence representative of the digital video sequence, the method comprises a step of transcoding the segment from a first coding format to a predetermined second coding format adapted for storage and transmission.

Such a feature enables the transcoding solely of the video sequence representative of the digital video sequence and not of the entirety of the video sequence. In this way, data of small size are sent implying rapid sending of those data even over a non-broadband communication line.

According to a feature, a descriptive table is created, said descriptive table comprising identification information for identification of the digital video sequence and information associated with each of the determined video segments.

Furthermore, for each of the determined video segments, the method may comprise a step of inserting, in the information associated with each of the segments of the descriptive table, said location information for location within the digital video sequence of said at least one video portion included in the video segment.

The storage of this information makes it possible later only to transmit complementary portions for a selected section that were not sent during the sending of the video sequence representative of the digital video sequence. Thus, the use of the resources of the communication network and the resources necessary for storage are optimized. This is because only the portions that are complementary to the sections that are desirable to the user are generated, sent over the communication network and stored.

The object of the present invention is also to provide a method of transmitting a video sequence representative of a digital video sequence in a communication network from a source communication apparatus to at least one recipient communication apparatus, comprising
a step of transmitting a video sequence representative of the digital video sequence from the source communication apparatus to at least one recipient communication apparatus,
the digital video sequence being divided into a plurality of digital video sections, the video sequence representative of the digital video sequence comprising a video segment for at least one digital video section, with each video segment comprising at least one video portion that is selected from the corresponding digital video section and that is located in the digital video sequence by at least one item of location information.

The method of transmitting a video sequence representative of a digital video sequence in a communication network from a source communication apparatus to at least one recipient communication apparatus is in particular based on the sending of a video sequence representative of a digital video sequence of small size, so as to optimize the use of the resources of the communication network.

The location information associated with each of the segments makes it possible to identify the portions already transmitted to the users, making it possible, at the request of a user for the obtainment of a section, to transmit only the complementary portions that are not included in the representative video sequence as specified below.

According to a possible feature, with each video segment is associated at least one item of identification information for identification of the digital video section corresponding to the video segment.

According to a possible feature, the digital video sequence being coded in a differential coding format, said digital video sequence comprising a plurality of groups of pictures (GOPs), each group being adapted to be decoded independently, the selected video portion comprises a whole number of groups of pictures (GOPs).

According to a first embodiment, said at least one item of location information is stored in the source communication apparatus.

In this way, on reception of a request for obtainment of a video section, the source communication apparatus is able to determine the portions that are complementary with respect to the portions of the section sent by means of the video sequence representative of the digital video sequence, only those complementary portions will, in particular, be sent in response to the request.

According to a second embodiment, said at least one item of location information is transmitted to said at least one recipient communication apparatus.

According to this embodiment, the recipient communication apparatus is able to determine the complementary portions missing from a section it wishes to obtain so as to send a request identifying those determined complementary portions.

According to another feature, the source communication apparatus and said at least one recipient communication apparatus form a peer-to-peer network.

The object of the present invention is also to provide a method of transmitting video data of a digital video sequence in a communication network from a source communication apparatus to a recipient communication apparatus, comprising the following steps:

receiving at least one request from the recipient communication apparatus for obtainment of at least one portion of a video section that is complementary with respect to a segment in a video sequence that is representative of the digital video sequence and that was previously transmitted to said recipient communication apparatus, the digital video sequence being divided into a plurality of digital video sections, the video sequence representative of the digital video sequence comprising a video segment for at least one digital video section, the video segment comprising at least one video portion selected from the corresponding digital video section and located in the digital video sequence by at least one item of location information, said at least one complementary portion of digital video section being determined by means of the location information, in response to said at least one request and for said at least one complementary portion of a requested video section, transmitting said at least one determined complementary portion.

The method of transmitting video data of a digital video sequence in a communication network from a source communication apparatus to a recipient communication apparatus is in particular based on the transmission of data of a video section required by a user.

These data comprise the portions that are complementary to the required sections, that is to say the video portions not inserted in the video sequence representative of the digital video sequence.

Thus, the exchanges between the communication apparatuses are optimized since only the data desirable to the user are sent over the network.

Furthermore, this method is based on the re-use of the data already transmitted in the representative video sequence since only the complementary portions are transmitted. This is made possible by the use of location information.

It is to be noted that the source communication apparatus and the recipient communication apparatus form a peer-to-peer network.

According to a possible feature, with each video segment is associated at least one identifier of the digital video section corresponding to the video segment.

According to one embodiment, said at least one complementary portion of digital video section is determined by the source communication apparatus by means of the location information stored in the source communication apparatus.

According to a second embodiment, said at least one complementary portion of digital video section is determined by the recipient communication apparatus by means of the location information that was previously transmitted to said recipient communication apparatus.

According to a possible feature, prior to the transmitting step, the method comprises a step of transcoding said at least one determined complementary portion of digital video section from a first coding format into a predetermined second coding format adapted for storage and transmission.

According to this feature, only the complementary portions undergo transcoding. Thus, the complete digital video sequence does not require transcoding.

Moreover, given that only the complementary portions are transcoded, the time to serve the user is minimized.

Similarly, it is to be noted that there is no duplication of the video portions transmitted.

The object of the present invention is also to provide a method of receiving video data of a digital video sequence in a recipient communication apparatus in a communication network, the video data being transmitted over the communication network by at least one source communication apparatus, comprising:

a step of receiving a video sequence representative of the digital video sequence transmitted by a source communication apparatus, the digital video sequence being divided into a plurality of digital video sections, the data representative of the digital video sequence comprising a video segment for at least one digital video section, the video segment comprising at least one video portion selected from the corresponding digital video section and located in the digital video sequence by at least one item of location information.

The method of receiving video data of a digital video sequence in a recipient communication apparatus in a communication network is in particular based on the reception of a video sequence representative of the digital video sequence. As the representative sequence is of small size since it is constituted solely by video portions, it requires little memory space for its storage, and can be received even by means of a non-broadband communication line.

It is to be noted that the recipient communication apparatus and said at least one source communication apparatus may form a peer-to-peer network.

The location information associated with the segment makes it possible to identify the video portions of the different sections of the video sequence which are received through the video sequence representative of the digital video sequence.

According to a possible feature, with each video segment is associated at least one identifier of the digital video section corresponding to the video segment.

According to a possible feature, the digital video sequence being coded in a differential coding format, said digital video sequence comprising a plurality of groups of pictures (GOPs), each group being adapted to be decoded independently, a video portion comprises a whole number of groups of pictures (GOPs).

According to another feature, the following steps are performed by the recipient communication apparatus:
  selecting at least one video segment in the representative video sequence,
  transmitting at least one request to at least one source communication apparatus to obtain at least one portion of a video section that is complementary with respect to a segment of the video sequence representative of the digital video sequence.

According to this other feature, the user may select a section of the video which he wishes to view and send a request in order to load solely that section. Thus, the access for the user to a section which he desires is fast.

According to one embodiment, said at least one request comprises an item of information identifying said at least one video section corresponding to said at least one selected video segment.

According to another embodiment, said at least one request comprises location information for location of said at least one complementary portion of digital video section determined by means of the location information for location within the digital video sequence of the at least one video portion included in the selected video segment.

According to another feature, it comprises a step of receiving the at least one portion of the digital video section that is complementary with respect to the segment previously received by the recipient communication apparatus.

According to a particular feature, it comprises a step of reconstructing the requested video section on the basis of said at least one complementary portion received and of the video segment previously received and selected.

According to this feature, the video portions received beforehand with the representative video sequence are reused for the purpose of reconstructing the section desired by the user, this reconstruction being carried out by means of the complementary portions received.

In a complementary manner, the invention also provides a device for creating a video sequence representative of a digital video sequence, comprising:
  dividing means adapted to divide the digital image video sequence into a plurality video sections,
  selecting means adapted to select at least one video portion in one of said video sections,
  determining means adapted to determine a video segment comprising said at least one video portion selected by said selecting means,
  associating means adapted to associate with the determined video segment at least one item of location information for location within the digital video sequence of said at least one video portion included in the segment, and
  inserting means adapted to insert the segment determined by said determining means in the video sequence representative of the digital video sequence.

This device has the same advantages as the method of creating a video sequence representative of a digital video sequence briefly described above.

The object of the present invention is also to provide a device for transmitting to at least one recipient communication apparatus a video sequence representative of a digital video sequence in a communication network, comprising transmitting means adapted to transmit a video sequence that is representative of the digital video sequence from the source communication apparatus to at least one recipient communication apparatus, the digital video sequence being divided into a plurality of digital video sections, the video sequence representative of the digital video sequence comprising a video segment for at least one digital video section, the video segment comprising at least one video portion selected from the corresponding digital video section and located in the digital video sequence by at least one item of location information.

This device has the same advantages as the method of transmitting a video sequence representative of a digital video sequence in a communication network briefly described above and they will not be repeated here.

The object of the present invention is also to provide a device for transmitting to a recipient communication apparatus video data from a digital video sequence in a communication network, wherein the device comprises:
  receiving means adapted to receive at least one request from the recipient communication apparatus for obtainment of at least one portion of a video section that is complementary with respect to a segment in a video sequence that is representative of the digital video sequence and that was previously transmitted to said recipient communication apparatus, the digital video sequence being divided into a plurality of digital video sections, the video sequence representative of the digital video sequence comprising a video segment for at least one digital video section, the video segment comprising at least one video portion selected from the corresponding digital video section and located in the digital video sequence by at least one item of location information,
  said at least one complementary portion of digital video section being determined by means of the location information,
  transmitting means adapted to transmit said at least one determined complementary portion in response to said at least one received request and for said at least one complementary portion of a requested video section.

This device has the same advantages as the method of transmitting video data of a digital video sequence in a communication network from a source communication apparatus to a recipient communication apparatus briefly described above and they will not be repeated here.

The object of the present invention is also to provide a device for receiving video data of a digital video sequence in a communication network, the video data being transmitted over the communication network by at least one source communication apparatus, wherein the device comprises receiving means adapted to receive a video sequence representative of the digital video sequence transmitted by a source communication apparatus, the digital video sequence being divided into a plurality of digital video sections, the data representative of the digital video sequence comprising a video segment for at least one digital video section, the video segment comprising at least one video portion selected from the corresponding digital video section and located in the digital video sequence by at least one item of location information.

This device has the same advantages as the method of receiving video data of a digital video sequence in a recipient communication apparatus in a communication network briefly described above and they will not be repeated here.

According to other aspects, the invention also concerns computer programs for an implementation of the methods of the invention described briefly above.

DETAILED DESCRIPTION

Figure 1:
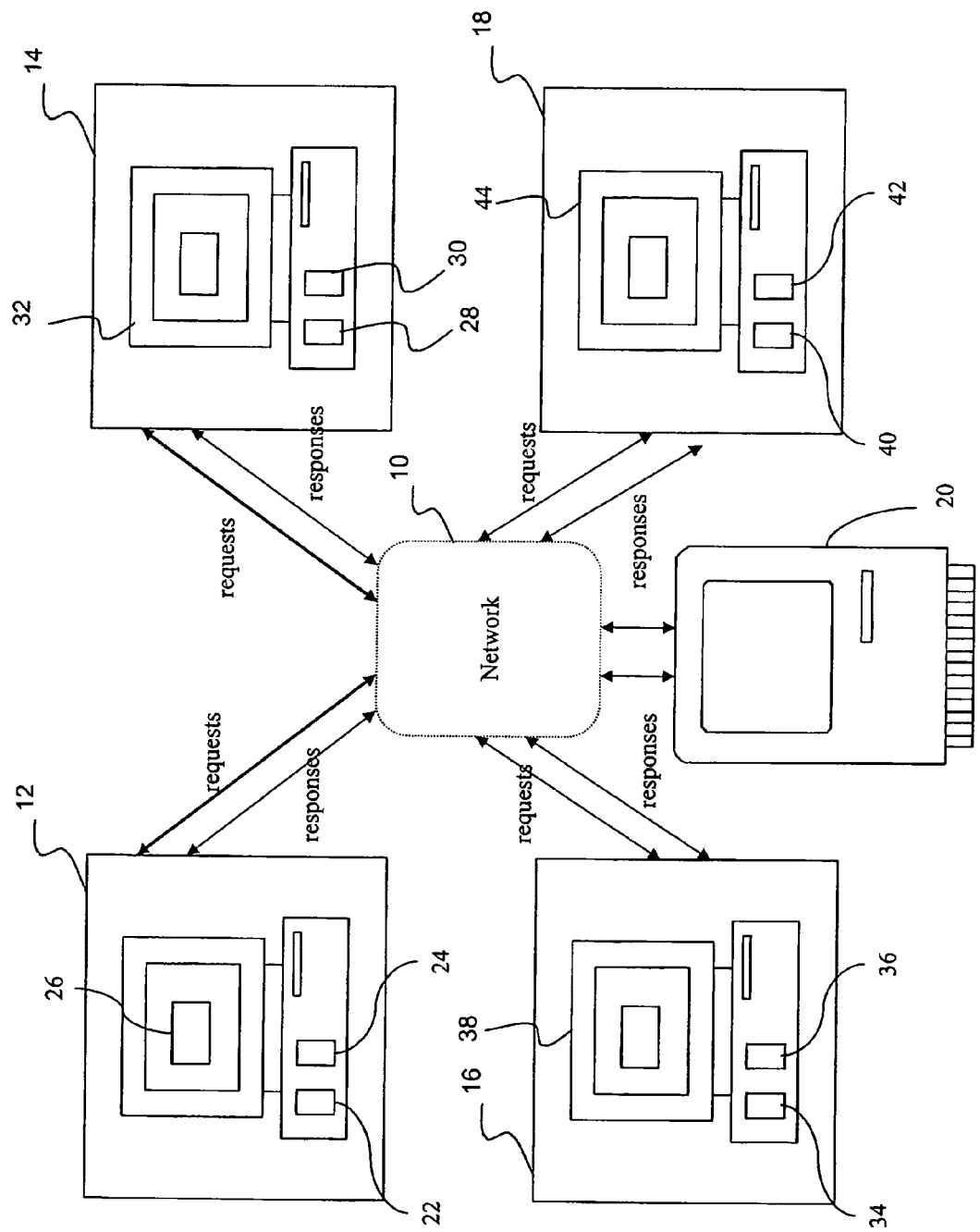
FIG. 1 is a diagram of a communication network of distributed type.

As represented in FIG. 1 and designated by the general reference numeral 10, a communication network of distributed type such as the Internet links a plurality of communication apparatuses 12, 14, 16, and 18 together as well as possibly a communication apparatus 20 which fulfills the role of a central server.

The latter is always connected to the network 10 and stores a set of data based on the exchanges which have taken place between the communication apparatuses in the form of requests and responses.

It should be noted that the term peer-to-peer exchanges is used in this context.

The set of data stored on the central server 20 contains, for example, information on the presence of each of the communication apparatuses identified as forming part of the network, and information on the contents which are stored locally in each communication apparatus.

It is also possible that the central server has certain data which may be found elsewhere in one or more communication apparatuses connected to the network.

The communication apparatuses connected to the network have known communication means.

Each of the communication apparatuses may for example take the form of the apparatus represented in FIG. 10 of which the description will be given later.

It will be noted that each communication apparatus may either comprise a device according to the invention or correspond to a device according to the invention.

The communication apparatus 12 comprises a volatile memory (cache memory) 22, a file server 24 and a user interface 26 enabling the user to formulate requests which will be transmitted via the network 10 to other communication apparatuses.

According to the invention, the communication apparatuses 12 to 18 communicate directly with each other via the network 10.

Nevertheless, according to a variant form of the invention, the central server 20 may also participate in the communication between the different communication apparatuses 12 to 18.

The communication apparatuses 14, 16, 18 also comprise a volatile memory, a file server and a user interface which are respectively referenced 28, 30, 32 for the apparatus 14, 34, 36 and 38 for the apparatus 16 and 40, 42 and 44 for the apparatus 18.

It will be noted that the invention applies to the transmission of multimedia digital data via the distributed communication network 10 represented in FIG. 1.

The multimedia data concerned constitute a digital video sequence in the embodiment.

For the purpose of optimizing the transmission and the storage of multimedia contents of large size in the terminals constituting a peer-to-peer type network, a representation table is created associated with those multimedia contents, termed a "story-board".

These multimedia contents, in particular videos, are intended to be exchanged between the different communication apparatuses.

In a first phase the invention concerns a method of creating a story-board, also termed a representative video sequence for multimedia data of digital video sequence type. This method may be implemented, for example, on each of the terminals of the peer-to-peer network.

The story-board constitutes a representation of in particular a digital video sequence in an appropriate compressed video format, that is to say, providing a good video quality while minimizing the quantity of data. The appropriate formats are in particular the MPEG2, MPEG4-part II or H264/AVC formats. This story-board may be read and displayed via a Web browser or a suitable multimedia application.

To do this, the digital video sequence is divided into a plurality of sections and a segment representative of each of the sections of the video sequence is extracted or constituted in order then to be processed and integrated into the story-board. The segments may be transcoded from a first coding format to a second coding format before being integrated into the story-board to reduce the storage space and the use of the bandwidth of the network.

A descriptive structure termed descriptive table comprises a set of information in such a way as to describe the sections of the video sequence and the representative segments of the sections.

The story-board and the descriptive table are transmitted to communication apparatuses of the network, via, in particular, a central server.

Thus, according to the invention, the time for processing the content of the original video sequence to make it undergo transcoding is reduced, since only the segments are converted into the appropriate coding format, and not the digital video sequence in its entirety.

Furthermore, contrary to the systems of the prior art, the quantity of data which is transmitted within the communication network is also reduced. This is because it is no longer necessary to transmit the whole of the video sequence to a client in order for the latter to select a portion of the sequence, but only the story-board and the descriptive table.

Having received those tables, the user of the communication apparatus may then select the sections of the video sequence which are of interest for him.

After this selection, the user's communication apparatus interrogates different communication apparatuses of the network in order to know what are the communication apparatuses capable of sending him each of the selected sections. These communication apparatuses must either have one of the selected sections or the original video sequence.

A communication apparatus which receives a request from a communication apparatus for obtaining at least one section of the video sequence, identifies the requested section, either in the original video sequence if the communication apparatus is the apparatus containing the original sequence, or among the sections of the video sequence which it received beforehand.

After this identification step, the communication apparatus processes each of the requested video sections so as to generate those sections in a coding format desired by the user.

In order to once again reduce the use of the bandwidth, the communication apparatus does not transmit the sections in their entirety, but only the portions of the sections which were not sent beforehand in the story-board, those portions of section being generated in an appropriate format if necessary.

The invention thus makes it possible only to code a sub-set of data of the original video sequence, this subset being composed of a plurality of segments representative of the different sections of the video sequence. Thus, reduction is achieved of both the processing time for coding the video in an appropriate format since only a sub-part of that sequence is coded, as well as of the quantity of information to transmit. Finally, use of the bandwidth is limited, since only the sections pertinent for the user are transmitted to him.

Similarly, the single transmission of the story-board between the communication apparatuses, then the transmission of solely the sections or portions of segments desired by a user also makes it possible to reduce the resources necessary for storage as well as the bandwidth.

On receiving the requested sections, the communication apparatus proceeds with reconstructing each of the sections. The complete sections may then be decoded so as to enable the user to view the sections in entirety.

Next, this communication apparatus stores the reconstructed sections in memory, and it will be possible for each of them to be transmitted later at the time of a request from another communication apparatus.

Figure 2:
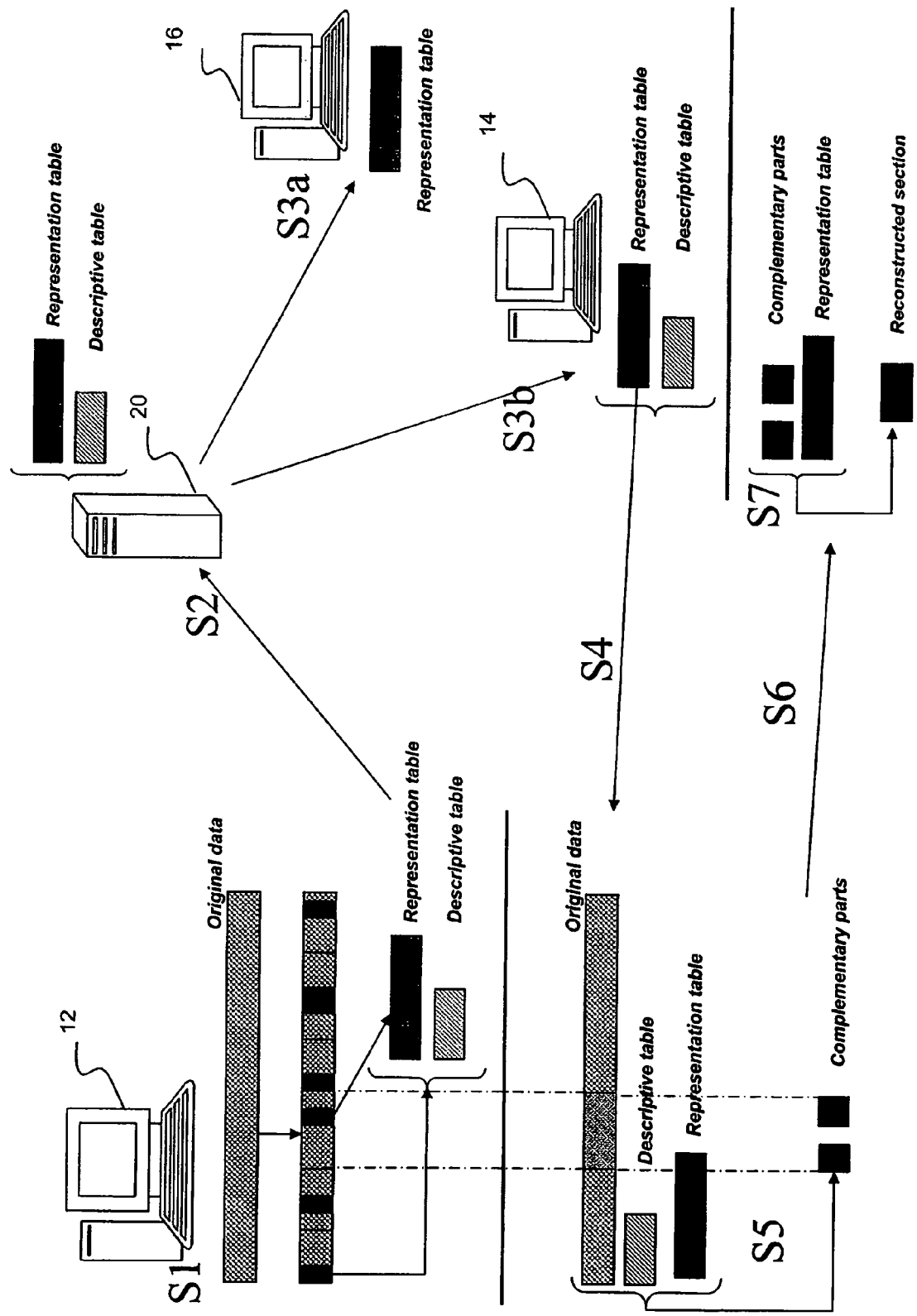
FIG. 2 is a diagrammatic representation of the processing of a video sequence and the transmission and reception of video data by the communication apparatuses of the communication network.

FIG. 2 illustrates a system for creating and transmitting video data of a digital video sequence according to the invention.

This system is composed of a communication apparatus, termed source communication apparatus 12, a central server 20, and a plurality of communication apparatuses, termed recipient communication apparatuses 14, 16. These different communication apparatuses and the central server 20 are connected together by means of the communication network of peer-to-peer type, which may in particular be the Internet network.

During a step S1 the source communication apparatus in the system, according to the invention, will create, on the basis of the original video sequence, a story-board of the video sequence as well as a descriptive table containing, in particular, the structure of the video sequence and the structure of the story-board. This step S1 mainly comprises two sub-steps.

The first sub-step comprises segmenting the video sequence. This segmentation enables video sections to be identified in the original video sequence. Next, for each of the video sections, selection is made of at least one video portion of that section and a video segment is determined on the basis of the selected video portions. Finally, this sub-step comprises constructing a descriptive table comprising information on the digital video sequence, the sections and the determined segments.

Prior to the construction of the descriptive table, the video segment is transcoded in the appropriate format.

The second sub-step comprises constructing a story-board of the video sequence by means of the video segments as well as the updating of the descriptive table.

According to another embodiment, the transcoding of the video segments may be carried out after constructing the descriptive table.

After creating the different tables, the source communication apparatus shares those tables in the peer-to-peer network (step S2).

For this, the source communication apparatus 12 transmits, in particular, the story-board and the descriptive table to the central server 20 of the hybrid peer-to-peer network.

Next, those tables are sent to the communication apparatuses 14,16 of the peer-to-peer network. Depending on the recipient communication apparatus, two cases may arise.

In the first case (step S3a), the recipient communication apparatus 16 has a standard display application of Internet browser type. Thus, by means of the story-board, the segments of the sequence may be viewed in the Internet browser.

In the second case (step S3b), the recipient communication apparatus 14 has a client application adapted to read the story-board and the descriptive table that are in accordance with the invention.

Thus, in this case, the story-board and the descriptive table are loaded and used by the client application in order to display the segments representative of the video sequence to the user.

By means of this client application, the user selects the section or sections he desires to obtain, and the communication apparatus sends a request in order to load the selected sections (step S4).

This request is established by means of the information contained in the descriptive table.

When the source communication apparatus storing the source video sequence receives this request, it prepares the sections requested by the user (step S5).

According to the invention, only the portions of the sections requested and not transmitted by means of the story-board are selected. These portions are termed complementary portions.

The complementary portions are, prior to their transmission, coded in the appropriate format if necessary, the appropriate format being the format selected for efficient storage and transmission.

Next, the complementary portions are transmitted to the recipient communication apparatus 14 (step S6).

On reception of the complementary portions of the sections, the recipient communication apparatus 14 reconstructs the section by combining the segment received beforehand via the story-board with the complementary portions so as to recreate the complete section (step S7) which may then be decoded and viewed.

Figure 3:
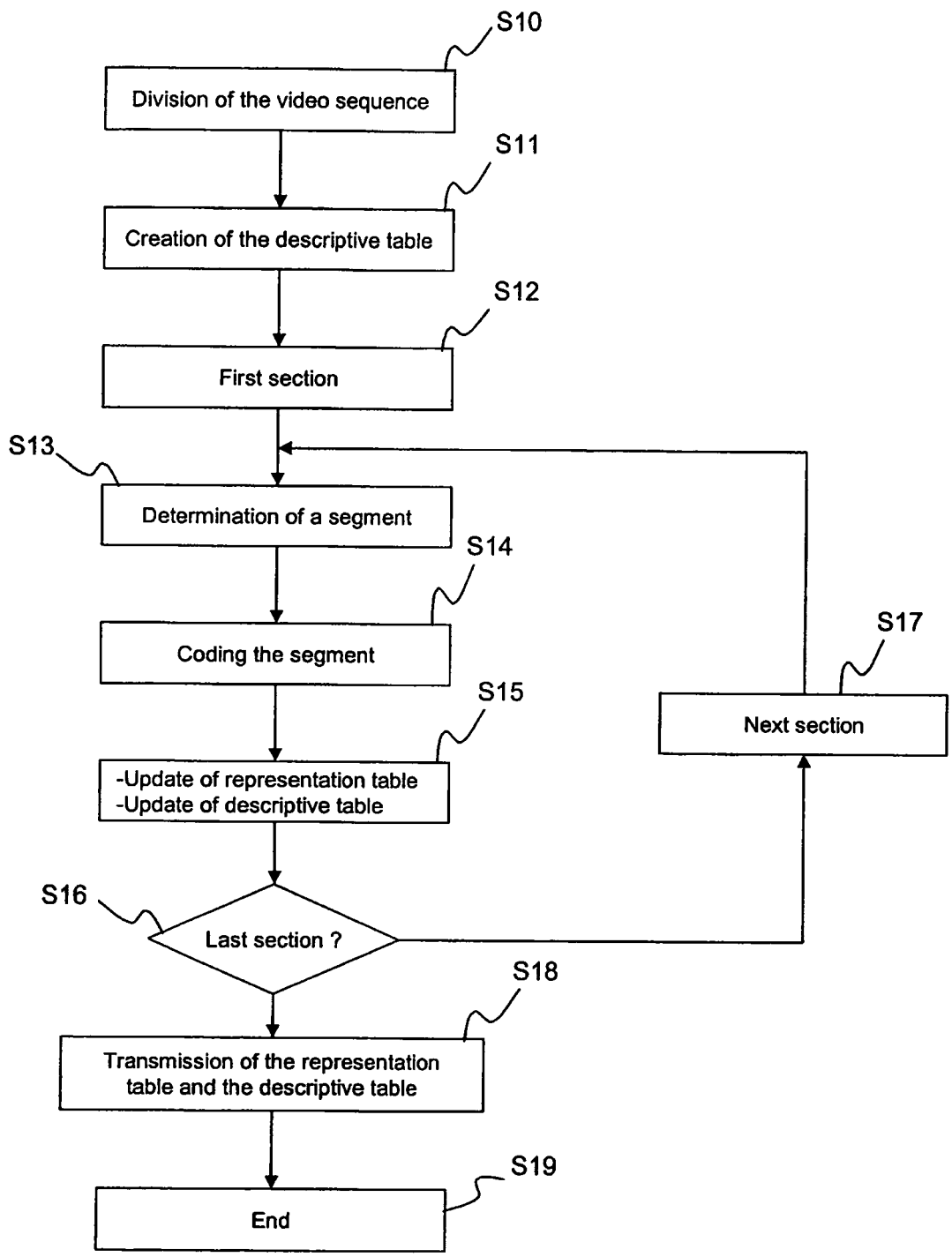
FIG. 3 is an algorithm of an embodiment of the method of processing a video sequence according to the invention.

With reference to FIG. 3, there are will now be described the algorithm for creating the story-board and the descriptive table as well as the sending of these tables to the central server.

Figure 4:
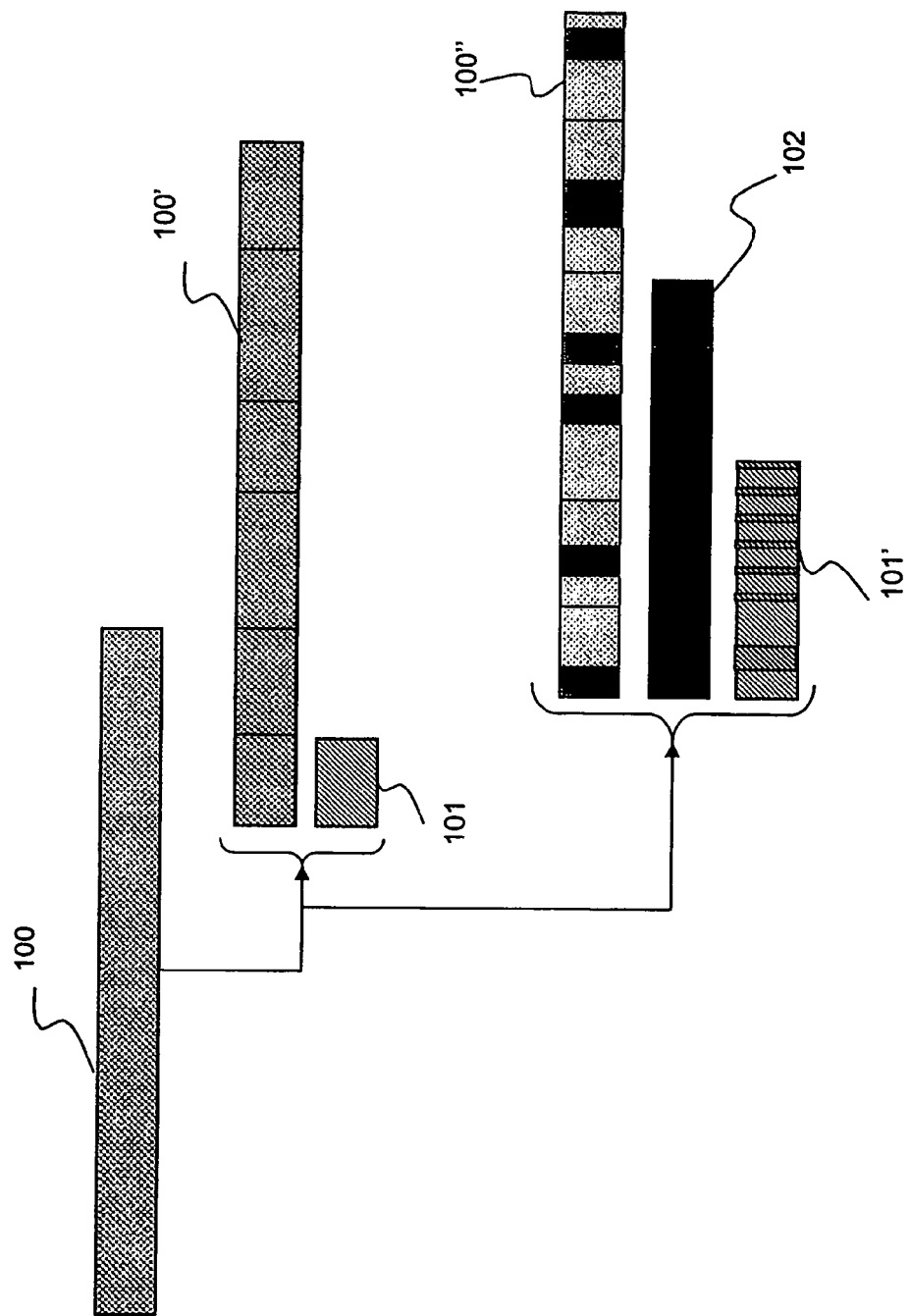
FIG. 4 is a diagrammatic representation of the segmentation of a video sequence according to the invention and the content of the story-board and of the descriptive table.

The algorithm commences by step S10 which consists of segmenting the original video sequence 100 into a plurality of video sections, as illustrated in FIG. 4 by the reference 100'.

Different techniques known in the state of the art may be used for creating the sections.

One method is based on using the duration of the video sequence and thus dividing that video sequence into video sections of fixed duration, for example, a duration of 5 minutes. If the last section is too short, that is to say, for example, less than 30 seconds, it is joined to the penultimate video section. This section will thus be longer that the preceding ones.

Another method consists of searching for changes of scene in the video stream. For this, analysis is made of the images of the video sequence, for example, using a colorimetric analysis or an analysis of the motion vectors and the detection of a large change.

However, given that the number of sections must be limited, if a video section is too short it is be joined with the shortest neighboring section.

According to another method, the sections may also be edited by a user. In this case, the user may also add textual information to the video sections.

During this step of segmenting the video sequence onto a plurality of video sections, it may be necessary to take into account the coding of the original video sequence to specify the exact limits of the video sections.

This is because, although certain video coding formats may be cut whatever the image, for example, in video sequences coded in the MJPEG or DV formats, most video coding formats use images that are differentially coded with respect to other images and thus cannot be cut in certain places.

This is because, in certain coding formats, when there is an image of I type, that is to say independently decodable with respect to the other images, that image is followed by a sequence of P images and B images. The P images are images that are differentially coded with respect to the preceding I or P image and the B images are images coded with respect to the preceding I image and with respect to the preceding and following P images.

A sequence of images composed of an I image and several P or B images is called a Group Of Pictures or GOP. This sequence of images or Group Of Pictures is independently decodable, but cannot be cut to perform the decoding.

Thus, if the original video sequence is coded in a coding format using differential coding, for example in the following formats: MPEG2, H263, MPEG4, H264, it is necessary to adjust the previously calculated limits of the sections to align them with the nearest I image.

At the end of step S10, a set of video sections is determined, and for each video section, the start image and end image are known in the original content of the digital video sequence.

Step S10 is followed by step S11 of creating a descriptive table in order to store the structural information of the original video sequence, as well as the structural information of the identified sections, as illustrated in FIG. 4 with reference 101.

This descriptive table is formed from a hierarchical structure described, for example, in XML format.

This table comprises in particular general information and information on the different video sections.

The general information comprises, for example, an item of information for identification of the video sequence, it being possible for this identifier to be for example a number generated randomly with a high probability of being unique, an item of information giving the coding format of the video, the duration of the video sequence, the number of images in the video sequence or the frame rate of the images, the resolution of the video sequence and a textual description of that video sequence.

The information specific to the video sections comprises for each section, for example, an item of information for identifying the video section, it being possible for this identifier to be for example a number generated randomly with a high probability of being unique, the duration of the video section, the number of images or the frame rate of the images, the date of commencement of the section or the number of the start image in the original video sequence, the end date of the section or the number of the end image in the original video sequence and possibly a textual description of the section.

Step S11 is followed by step S12 which consists of selecting the first section of the digital video sequence.

Next, step S12 is followed by step S13 which consists of determining for that section a segment representative of section 100".

In a first embodiment, the video segment representative of a section is a short video sequence which should enable the client to have a general idea of the content of the video section.

For this, a portion of the video section is determined.

A first method consists of selecting a sequence of a few seconds situated either at the start, or in the middle of the section. For example, the first 15 seconds of the video section are selected, or the 15 seconds in the middle of the video section.

According to another method, the video of the section is analyzed and a selection is made of a part representative of the video section.

The analysis and the selection may be made by a user.

According to this method, the selected segments are of fixed size, in the same way as when using the first method, or of variable size.

According to a second embodiment, the segment representative of the section is constructed on the basis of a plurality of portions of section.

For this, video portions are selected in the video section that are representative of that section. Next, these portions are juxtaposed so as to create a segment representative of the section.

Where the original digital video sequence is in a format coded by differential coding between the images, as seen previously, the limits of the segments or portions is determined, that is to say the start and the end of the segments or portions so as not to cut a Group Of Pictures. In this way, the segments and the portions are formed from a whole number of Group Of Pictures, this number being at least one.

Furthermore, if the section has to be transcoded later into another coding format, then that coding must respect the sequencing of the I images so as to keep a segment representative of the section which does not cut a Group Of Pictures.

Where the original video sequence is coded in a coding format enabling the video sequence to be cut whatever the image, account must nevertheless be taken of the transcoding into the coding format used for the transfer of the story-board and of the sections.

More particularly, in order to be efficient in coding terms, the segments of the video sequence may be coded in a differential coding format, for example in the H264 format.

In this case a sequencing of I, P and B images is chosen to form the Group of Pictures (GOPs). For example, fourteen images of P and B type are made to follow an I image, so forming a Group Of Pictures of size 15.

Thus the size of the Groups of Pictures of each section is known and it is thus possible to position the start and end of the representative segment without cutting Groups of Pictures.

Step S13 is then followed by step S14 consisting of coding the determined segment, if necessary, in the video format chosen that enables the efficient storage and transport of that segment to a recipient communication apparatus, for example H264

Step S14 is then followed by the step S15 during which the story-board is updated by assembling the current segment with the segments already present in the story-board in order to form a single video representative of the original digital video sequence 102.

Next, the descriptive table 101' is updated as illustrated in FIG. 4.

For this, the following data are inserted into the part concerning the general information of the descriptive table. First of all, the item of information is inserted indicating the coding format of the video contained in the story-board. Next, the number of images forming the story-board or the frame rate of the images is inserted.

Similarly, the following items of information which were determined at step S13 are inserted in the part concerning the items of information relative to the video segment.

These items of information concern, firstly, the duration of the determined video segment, next, the item of location information of the determined segment or of the portions included in the determined segment in the original digital video sequence. This item of location information comprises, for example, the date or the image number in the video sequence giving the start of the segment and the date or the image number in the video sequence giving the end of the segment.

According to another embodiment, this item of location information comprises the date or the image number in the video section, that is to say with respect to the start of the section, giving the start of the segment and the date or the image number in the video section, that is to say with respect to the start of the section, giving the end of the segment.

Similarly, among these items of information there are items of information for location of the segment in the story-board. These items of location information comprise, for example, the date or the image number in the story-board giving the start of the segment and the date or the image number in the story-board giving the end of the segment.

Figure 5:
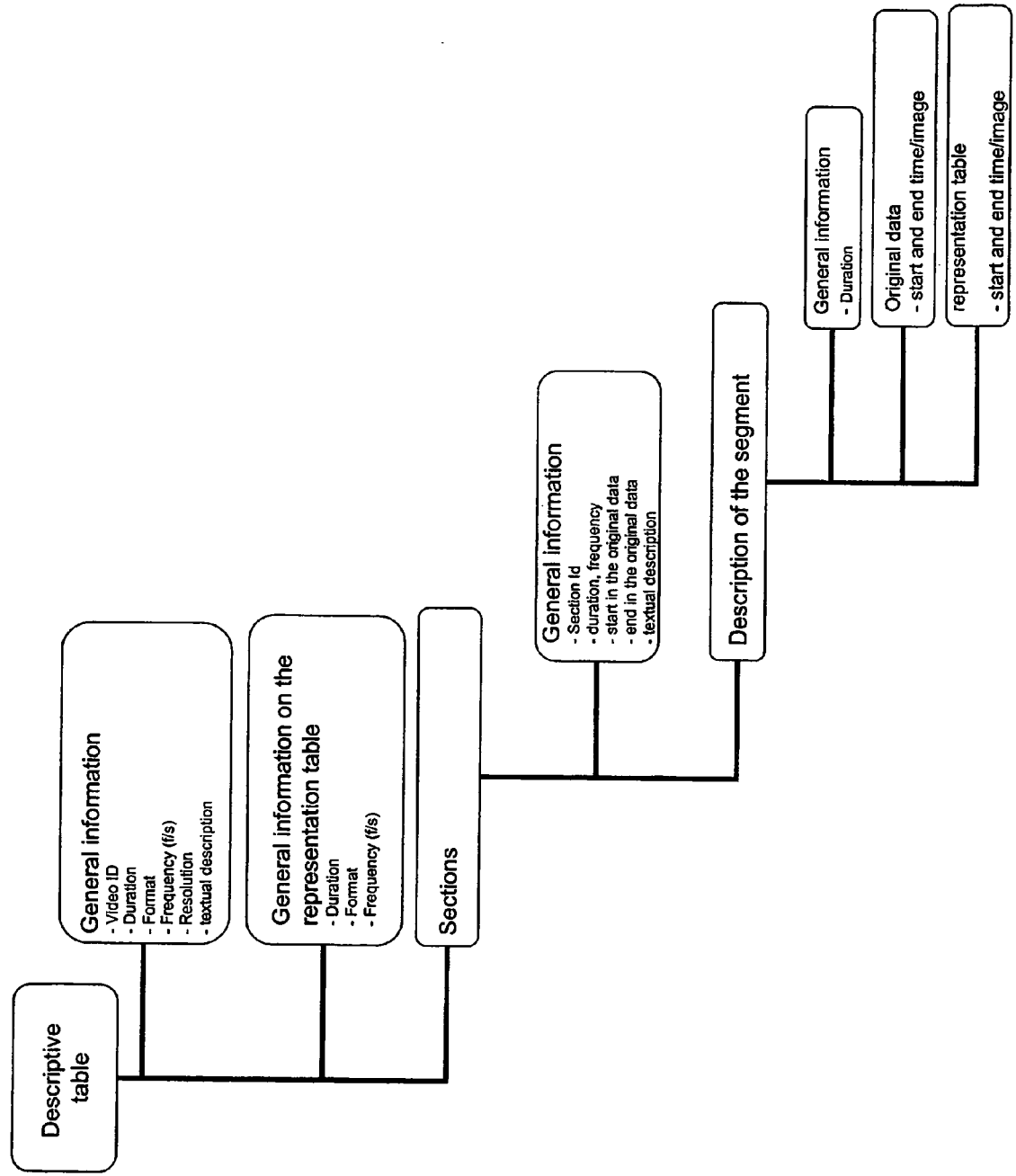
FIG. 5 illustrates a tree-structure representation of the descriptive table according to the invention.

FIG. 5 gives a representation of the descriptive table, illustrating thereby a tree-structure organization of all the information in that table, the information being described below.

Step S15 is followed by step S16 consisting of testing whether there remain any video sections to process.

In the affirmative, step S16 is followed by step S17 consisting of selecting the following section. Next, steps S13 to S16 are iterated for as long as there remain sections to process.

In the opposite case, step S16 is followed by step S18 consisting of transmitting the story-board and the descriptive table on the peer-to-peer network.

In the case of a hybrid peer-to-peer network, those two tables are transmitted to the central server 20 in order to make those tables accessible to all the communication apparatus of the network.

A notification is then transmitted to all the communication apparatuses of the network, including, in particular, the identification information of the video sequence, for example the unique identification number of the video sequence, this item of information enabling the receivers to search for the story-board on the network or on the central server.

In a variant embodiment, the two tables are transmitted directly to the different communication apparatuses of the peer-to-peer network.

Next, that algorithm is terminated at step S19.

The central server 20 stores the story-boards and the descriptive tables sent by the communication apparatuses of the peer-to-peer network and will permit access to those tables by all the communication apparatuses of the network.

Figure 6:
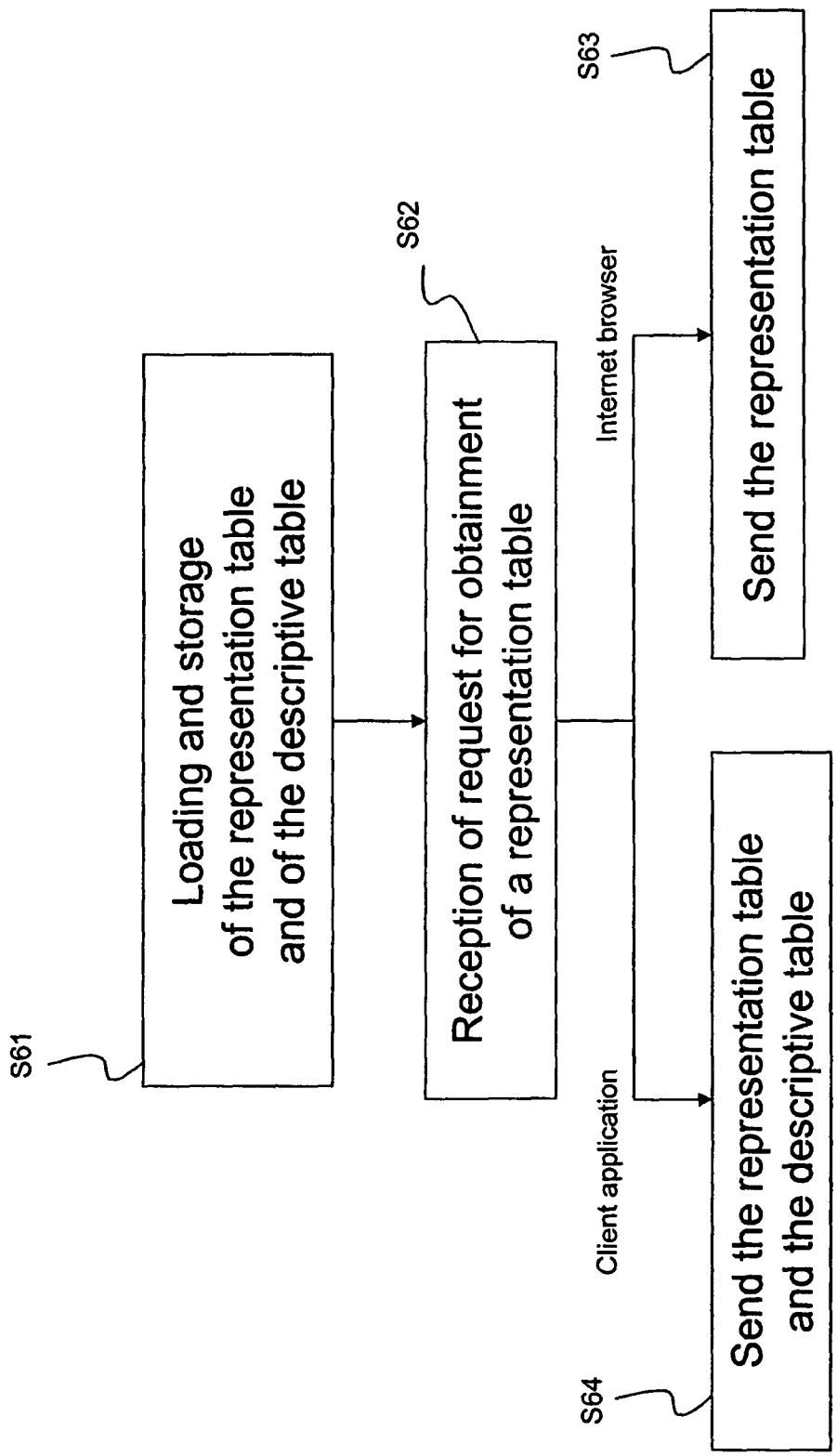
FIG. 6 is an algorithm for receiving the story-board and the descriptive table according to the invention.

With reference to FIG. 6, a description will now be given of the algorithm implemented on the central server of the hybrid peer-to-peer network.

The algorithm comprises a first step S61 during which the central server 20 loads and stores the story-boards and the descriptive tables which it receives from the different communication apparatuses of the peer-to-peer network.

Next, at step S62, the central server 20 receives communication apparatus requests from the network 14, 16. These requests come either from a standard browser, for example Internet Explorer™, or from a specific client application dedicated to the reading of the digital video sequences according to the invention.

A request coming from a communication apparatus comprises at least one item of information for identification of the video sequence, the video sequence having been selected by the user of the communication apparatus.

Thus, a user may request access to a video sequence, either on the basis of an item of information which it has received beforehand, or on the basis of the result of a search which it has made on the central server, using, for example the textual description associated with the videos.

After reception of such a request, the central server 20 transmits the story-board and the associated descriptive table to the communication apparatus at the origin of that request (steps S63, S64).

If the communication apparatus at the origin of the request only has a standard Internet browser, for example Internet Explorer™ (Registered Trademark), then only the story-board is necessary for it to view the video representative of the original digital video sequence. Thus, the central server only transmits the story-board (step S63).

In this case, viewing is carried out by means of a specific application adapted to display digital video sequences of Windows MediaPlayer type.

To access a section, the client may receive and display a page created by the server on the basis of the descriptive table representing the different sections using representative segments. The user may then directly select a section.

In the case in which the communication apparatus at the origin of the request includes a specific client application, the central server transmits the story-board and the associated descriptive table to that apparatus (step S64).

Note that in a particular embodiment, the descriptive table may be inserted in advance in the same file as the story-board, for example in the form of metadata associated with the video coding format. In this case, those metadata are exploited solely by the specific client application.

The communication apparatus having a specific client application may view the story-board in a specialized graphical interface.

This application also enables the user to select one or more sections which he wishes to load.

According to one embodiment, the graphical interface of the specific client application may, for example, display the video of the story-board and also display a button the activation of which causes the video segment in course of viewing to be selected.

According to another embodiment, the graphical interface of the specific client application makes it possible to display an image or a thumbnail image of each video segment.

Activation of an image, for example by means of a single mouse click on the image of a segment, causes the video segment to be viewed. Moreover, activation of an image, for example by means of a double mouse click on the image of a segment causes the video segment to be selected.

In order to determine which is the selected segment and thus the associated section, the application searches in the descriptive table for the information concerning the segments and their location in the story-board.

When a selected segment is determined, the specific client application searches in the descriptive table for the information for identification of the section associated with that segment.

After having determined the section or sections selected by the user, the application generates a request containing the information for identification of the sections in order to obtain the entirety of those sections.

Alternatively, another embodiment may be envisaged in which the receiver communication apparatus only receives the story-board, even if it has the specific client application. In this case, it may for example send an item of information on date or position of an image of the segment representative of the desired section in a request, and it is the server communication apparatus receiving that request which searches, in the descriptive table, for the information for identification of the section associated with that segment.

Once the request has been generated, it is sent onto the network to search for the requested sections.

According to a variant embodiment, the application determines the complementary portions for at least one requested section and generates a request containing the information for identification of the sections and of the complementary portions. The complementary portions are determined by means of the information for location of the segments and of the portions included in the segments and the sections, as described below.

In the case of a peer-to-peer type network, the search is made on the network, for example using the Gnutella search protocol.

In the case of a network of hybrid peer-to-peer type, the request may, for example, be sent to the central server 20 for the purpose of interrogating the server and determining a communication apparatus suitable for providing at least one determined section.

A third method consists of using the information available on the transmission of the story-board and the descriptive table by the original communication apparatus; for example the identity of the person who shared the video or the identity of other recipients of the video, which may make it possible to determine the address of at least one communication apparatus capable of storing the section sought.

Figure 7:
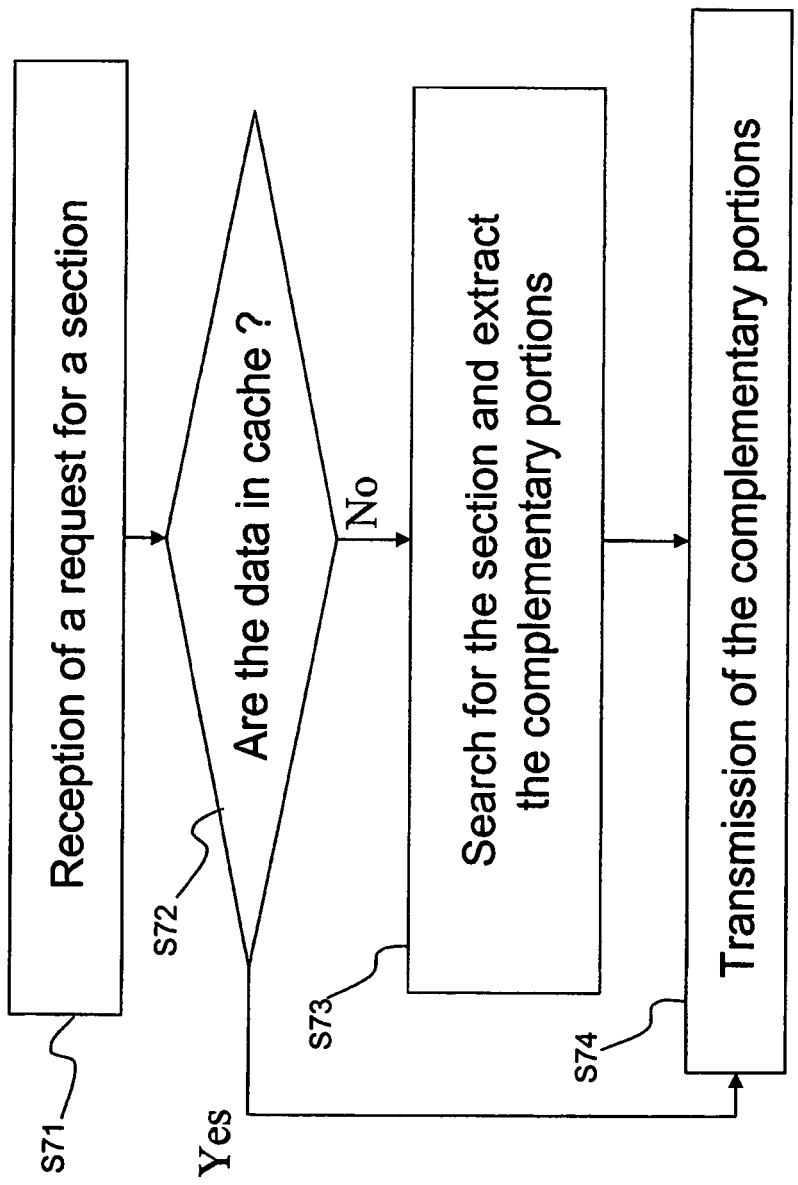
FIG. 7 is an algorithm of an embodiment of the method of generating complementary portions of a section in a communication apparatus storing the original video sequence in memory according to the invention.

The result of this search makes it possible in a first case to result in a communication apparatus having the original video sequence, this case being illustrated by means of FIG. 7. In a second case, the search results in identifying a communication apparatus storing at least one section sought for, this case being illustrated by means of FIG. 8.

FIG. 7 thus illustrates the case of transmission of a section from a source communication apparatus to a recipient communication apparatus when the source communication apparatus stores the original digital video sequence The first step of this algorithm (step S71) consists of receiving a request from a recipient communication apparatus.

The request comprises, in particular, the information for identification of the video sequence concerned as well as the information for identification of one or more requested sections.

On the basis of the identification information of the digital video sequence, the communication apparatus searches for the original video sequence and the associated descriptive table, the video sequence and the descriptive table being stored locally on the communication apparatus (step S72).

Thus, during step S72, it is tested whether the data of the digital video sequence are stored in the cache type memory of the apparatus.

If the result of this test is positive, the algorithm continues at step S74 described below.

In the negative, that is to say if the data of the video sequence are stored in storage memory and not in cache memory, step S72 is followed by step S73.

During this step, a search is made on the basis of the item of identification information of a section present in the request, for the information associated with that section in the descriptive table stored on the communication apparatus.

The information associated with that section contains, in particular, the information making it possible to identify the start and the end of the section in the original video sequence.

Similarly, the information concerning the representative segment and its location in the digital video sequence is also searched for in the descriptive table.

On the basis of information, the portions of the video sequence that are to be transmitted to the recipient communication apparatus are extracted.

According to a first embodiment in which the segment is a portion contiguous with the video section, two portions are extracted from the video sequence. The first extracted portion starts at the start address of the section and ends at the start address of the segment. The second extracted portion starts at the end address of the segment and ends at the end address of the video section.

If the segment is situated at an edge of the section, only one portion is extracted.

These portions are termed complementary portions. Thus they are composed of portions not sent to the recipient communication apparatus by the story-board.

These portions are then coded, if necessary, in the format adapted to the efficient storage and transport thereof, this format already being used for the coding of the segments.

According to a second embodiment in which the segment is composed of a plurality of portions of the corresponding video section, a plurality of portions are extracted from the video sequence corresponding to the complementary portions of each of the sections.

The plurality of portions is then coded, if necessary, in the format adapted to the efficient storage and transport thereof, this format already being used for the coding of the segments.

As the limits of the segments have been positioned on the limits of the Groups Of Pictures (GOPs), each section is composed of a whole number of Groups Of Pictures and may thus be transcoded independently and thus rapidly.

These coded portions are then stored in a cache type memory for a limited duration. This cache memory makes it possible to rapidly reply to new requests from other communication apparatuses wishing to obtain that section.

Step S73 is followed by step S74 consisting of transmitting the complementary portions to the recipient communication apparatus.

According to a first method, well adapted to the HTTP protocol, the method according to the invention informs the recipient communication apparatus that the reply comprises two video portions. The recipient thus sends two HTTP requests of GET type successively in order to obtain each of the portions.

According to another method, the communication apparatus having the video portions transmits, in a single message, the different video portions as well as the item of information necessary for the recipient communication apparatus to identify the different portions of video.

Figure 8:
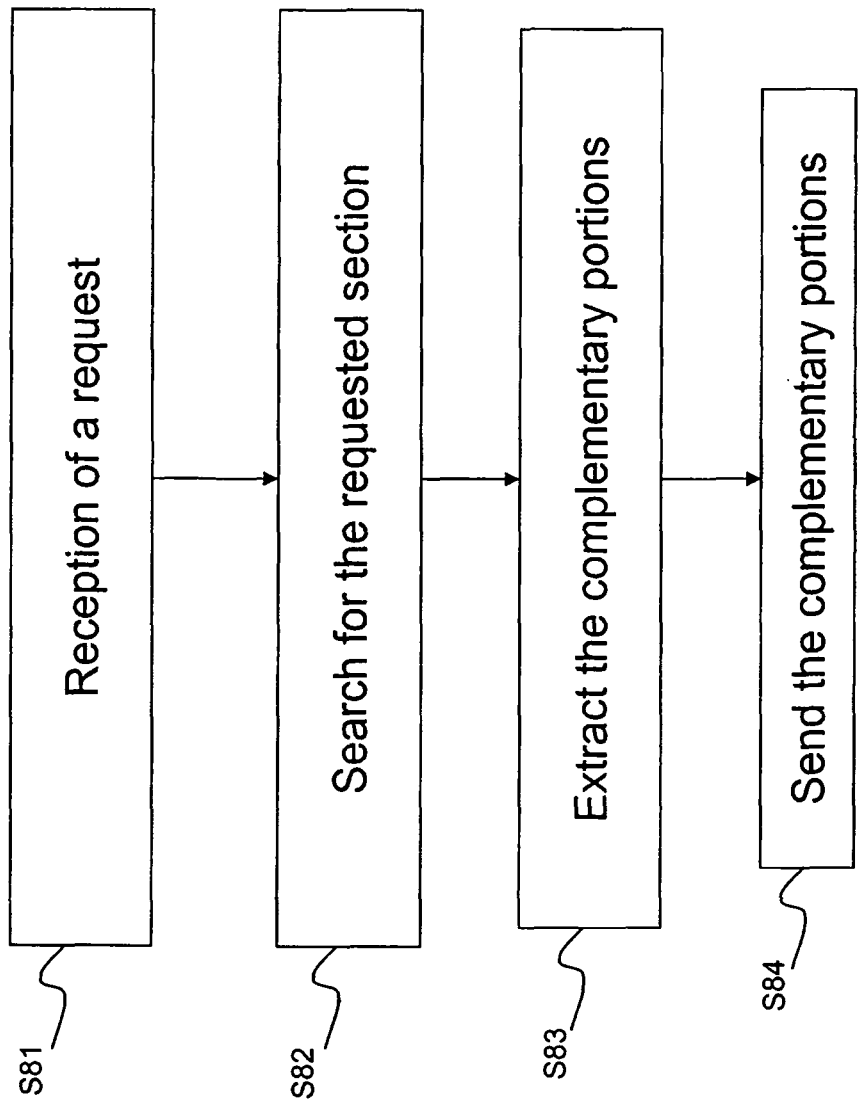
FIG. 8 is an algorithm of an embodiment of the method of generating complementary portions of a section in a communication apparatus storing sections of the video sequence in memory according to the invention.

With reference to FIG. 8, a description is now given of the case of generating and transmitting complementary portions in a communication apparatus storing sections of the video sequence.

This therefore concerns the algorithm executing in the communication apparatus which stores not the original video sequence but one or more sections of the video sequence, at least one corresponding to a section requested by the recipient communication apparatus. If a transcoding format has been chosen, the sections received are stored in the selected format.

The algorithm commences at step S81 with the reception of a request for obtainment of a section. This request comprises at least one item of information making it possible to identify not only the video sequence concerned but also one or more sections.

The communication apparatus receiving this request does not have the original video sequence but it does have in memory the descriptive table of that video sequence as well as the video portions which it received when itself making a request in accordance with the invention.

At step S82, the descriptive table and the requested section are searched for locally, that is to say, in the file system of the communication apparatus.

Step S83 follows step S82. During this step, the communication apparatus recreates the video portions which must be sent.

For this, the following steps are carried out.

Firstly, by means of the item of information for identification of the section present in the request, the communication apparatus receiving that request searches for the item of information associated with the section in the descriptive table.

The information searched for concerns, in particular, the information for identifying the start and the end of the section in the original video sequence.

Next, the item of information concerning both the segment representative of the section in the video sequence as well as the location of the segment in the original video sequence is searched for in the descriptive table.

On the basis of this item of information, the location of the segment in the video section may be calculated by finding the difference between the segment start address and the section start address, and the difference between the segment end address and the section start address.

Finally, the communication apparatus extracts the portions of the video section in the transcoding format used to store the section.

The start portion of the section and the end portion of the section may be empty if the segment representative of the section is situated at the section start or end.

As set forth earlier with reference to FIG. 4, the bounds of the representative segment are calculated to be correctly positioned on the limits of the Groups Of Pictures, which makes it possible to extract the complementary portions directly in their coded format. Thus, it is not necessary to decode the video to carry out that extraction and then recode the portion. In this way, the extraction operation is carried out rapidly.

Step S83 is followed by step S84 of transmitting the complementary portions to the recipient communication apparatus.

Different methods may be implemented to carry out this transmission as seen earlier.

Figure 9:
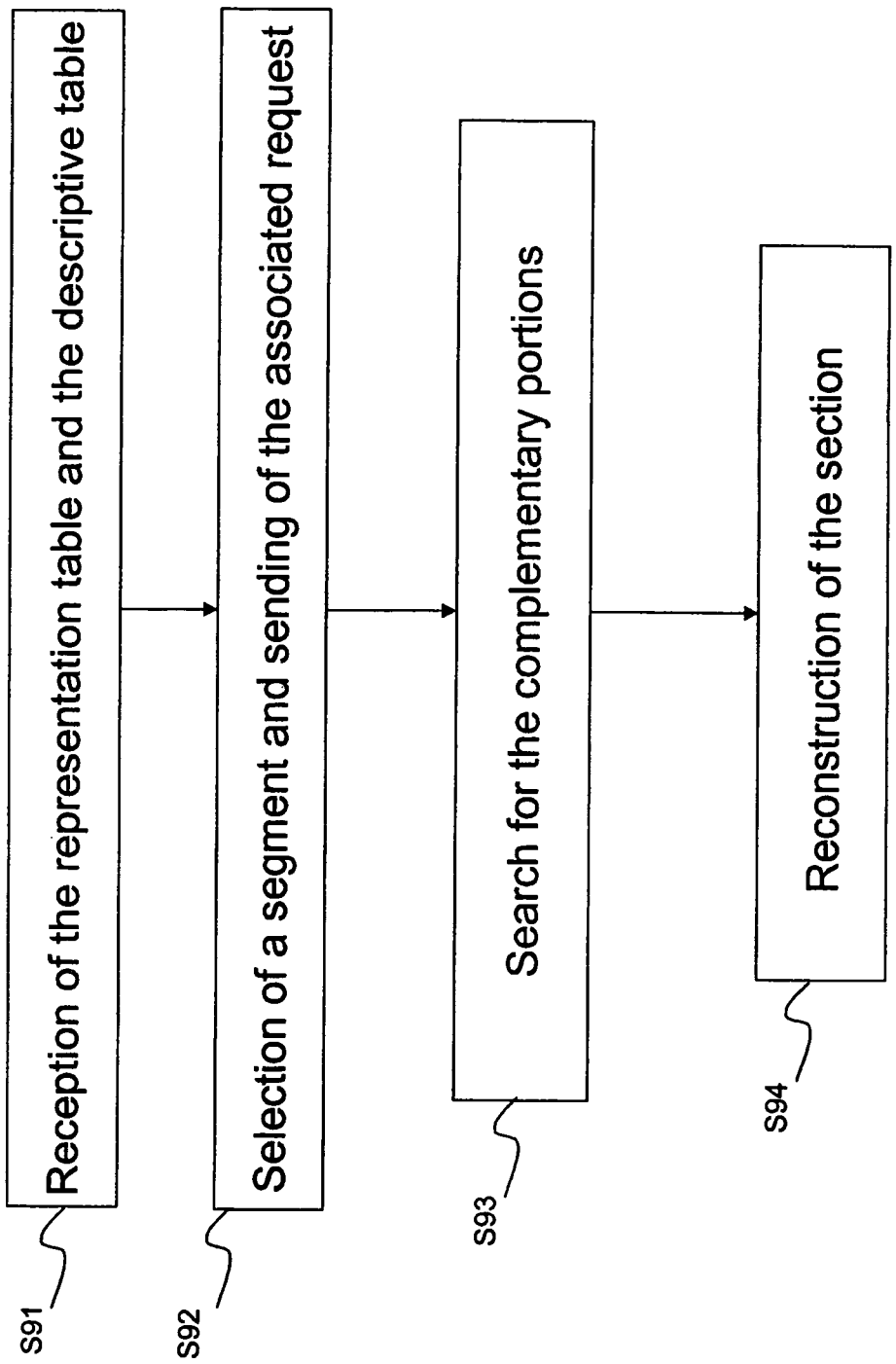
FIG. 9 is an algorithm of an embodiment of the method of reconstructing a section according to the invention.

With reference to FIG. 9, a description will now be given of the method of reconstructing the video section in the communication apparatus which made the requests to obtain the sections selected by the user.

Thus, after having received a story-board of a video sequence and the associated descriptive table (step S91), the user selects a section in a story-board of a digital video sequence (step S92).

Next, the communication apparatus sends at least one request for obtainment of the selected section (step S93).

A communication apparatus of the peer-to-peer type network transmits the portions of video that are complementary to the selected section to that communication apparatus in order for the latter to reconstruct the section and for its user to be able to view the selected section.

Step S93 is followed by step S94 of reconstructing the section by means of the segment contained in the story-board and the complementary portions received at step S93.

For this, the segment representative of the section is extracted from the story-board using the information for location of the segment, that is to say by means of the start address and end address of the segment in the story-board, this information being present in the descriptive table.

The section is next reconstructed by concatenating the extracted segment with the complementary portions received.

In the case in which the segment is a unique portion of the section, the section is reconstructed in the following manner. A first complementary portion is concatenated with the start of the segment and a second complementary portion is positioned following on from that segment.

When the segment is constituted by a plurality of section portions the reconstruction is more complex since complementary portions are inserted into the video stream of the segment.

The reconstructed section is next stored locally in memory in the communication apparatus in the selected transcoding format.

This reconstructed section may then be decoded then viewed by the client.

It can subsequently be used to serve the complementary portions to other communication apparatuses of the peer-to-peer network as described in FIG. 8.

Figure 10:
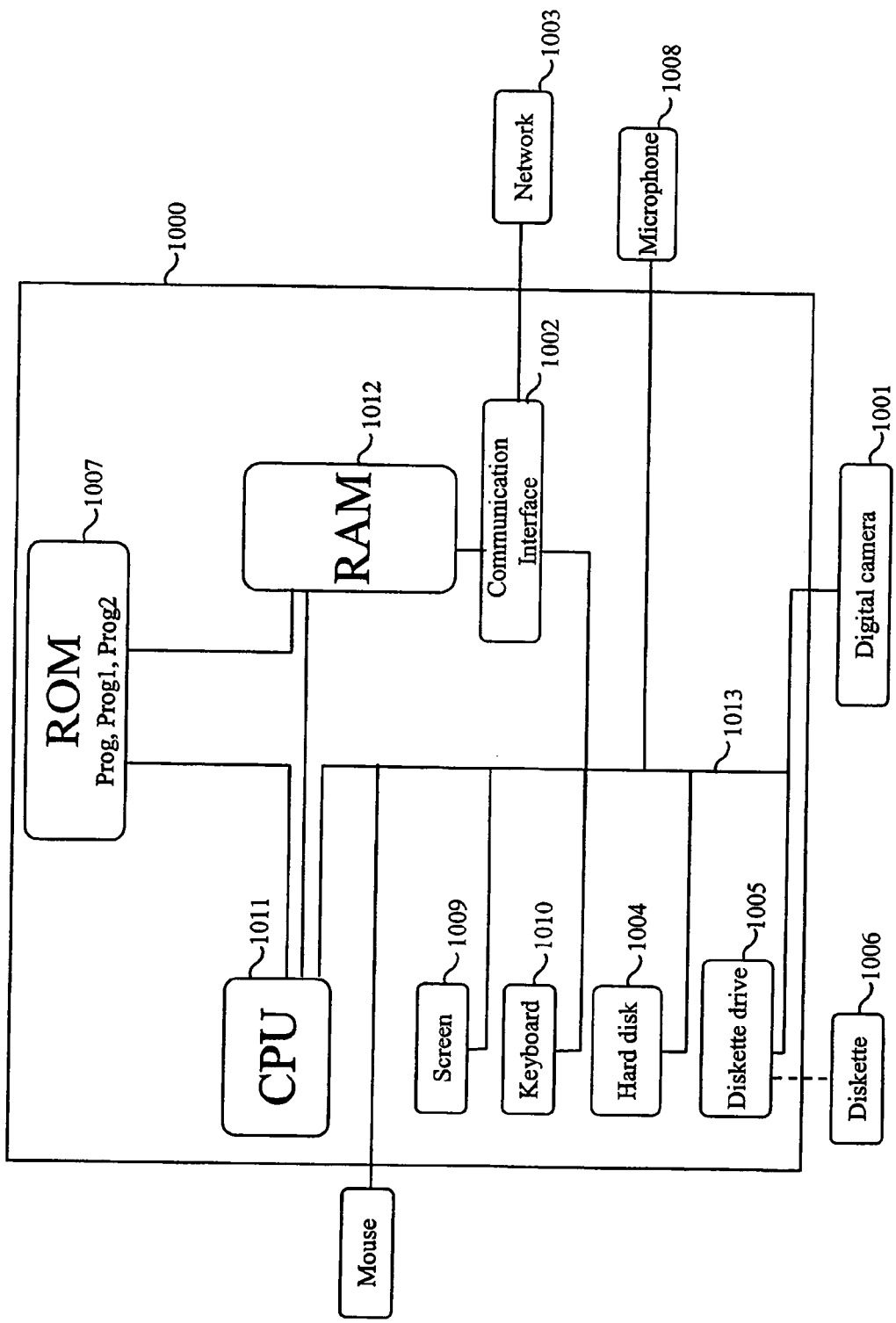
FIG. 10 is a diagrammatic representation of a communication apparatus implementing the invention.

With reference to FIG. 10, a device adapted to operate as a device for processing a digital video sequence and/or device for transmitting video data of a video sequence and/or a device for receiving video data of a video sequence according to the invention will now be described in terms of its hardware configuration.

The processing device of FIG. 10 has all the necessary means for implementing the method of creating a representative digital video sequence and/or the methods of transmitting video data of a video sequence and/or the method of receiving video data of a video sequence according to the invention.

According to the embodiment chosen, this device may for example be a microcomputer 1000 connected to different peripherals, for example a digital camera 1001 (or an analog to digital converter or any other image acquisition or storage means) and thus supplying the information to be processed according to the invention.

This device may also be a workstation, a digital assistant, a camera or a mobile telephone.

The micro-computer 1000 preferably comprises a communication interface 1002 connected to a network 1003 adapted to transmit digital information. The micro-computer 1000 also comprises a storage means 1004, such as a hard disk, as well as an external disk drive 1005.

The external disk drive 1006 like the hard disk 1004 can contain software installation data of the invention as well as the code of the invention which, once read by the microcomputer 1000, will be stored on the hard disk 1004.

According to a variant, the programs enabling device 1000 to implement the invention are stored in a read only memory ROM 1007.

According to another variant, the program or programs are partly or wholly received via the communication network 1003 in order to be stored as stated.

The micro-computer 1000 may also be connected to a microphone 1008 through an input/output card (not shown). The micro-computer 1000 also comprises a screen 1009 for viewing the information to be processed and/or serving as an interface with the user, so that the user may for example interact with the programs according to the invention, parameterize certain processing modes using the keyboard 1010 or any other appropriate means such as a mouse or touch screen.

The central processing unit CPU 1011 executes the instructions relating to the implementation of the invention, which are stored in the read only memory ROM 1007 or in the other storage means described.

On powering up, the processing programs and methods stored in one of the non-volatile memories, for example the ROM 1007, are transferred into the random access memory RAM 1012, which will then contain the executable code of the invention as well as the variables and parameters necessary for implementing the invention.

As a variant, the methods may be stored in different storage locations of the device 1000. Generally, an information storage means, which can be read by a computer or microprocessor, integrated or not into the device, and which may possibly be removable, stores a program of which the execution implements the methods of creating a representative video sequence, of transmission and of reception. It is also possible to upgrade the embodiment of the invention, for example, by adding methods brought up to date or improved that are transmitted by the communication network 1003 or loaded via one or more diskettes 1006. Naturally, the diskettes 1006 may be replaced by any type of information carrier such as CD-ROM, or memory card.

A communication bus 1013 enables communication and interoperability between the different elements of the microcomputer 1000 and the elements connected thereto. It will be noted that the representation of the bus 1013 is non-limiting. Thus the central processing unit CPU 1011 may, for example, communicate instructions to any element of the micro-computer 1000, directly or via another element of the microcomputer 1000.

It should be noted that the communication apparatus comprising the device according to the invention can also be a programmed apparatus. This apparatus then contains the code of the computer program or programs, for example, fixed in an application specific integrated circuit (ASIC).

Of course, the present invention is in no way limited to the embodiments described and represented, but encompasses, on the contrary, any variant form within the capability of the person skilled in the art.

The invention claimed is:

1. A method of creating a video sequence representative of a digital video sequence, wherein the digital video sequence is coded in a differential coding format, said digital video sequence comprising a plurality of groups of pictures (GOPs), each group of pictures being adapted to be decoded independently, the method comprising the following steps:

dividing the digital video sequence into a plurality of video sections, and for at least one of said video sections of the digital video sequence:

selecting, from the video section, at least one video portion comprising a plurality of images, wherein selecting said at least one video portion comprises selecting a portion of the video from the video section and modifying the start and end of the selected portion in order to include a whole number of groups of pictures (GOPs);

determining a video segment, taking into account coding of the video sequence, comprising said at least one selected video portion, associating with the determined video segment at least one item of location information for location within the digital video sequence of said at least one video portion included in the segment, and adding the determined segment to the video sequence representative of the digital video sequence.

2. A method according to claim 1, wherein at least one item of identification information for identification of the selected video section is associated with the video segment.

3. A method according to claim 1, wherein, prior to the step of adding the segment to the video sequence representative of the digital video sequence, the method comprises a step of transcoding the segment from a first coding format to a predetermined second coding format adapted for storage and transmission.

4. A method according to claim 1, wherein a descriptive table is created, said descriptive table comprising identification information for identification of the digital video sequence and information associated with each of the determined video segments.

5. A method according to claim 4, comprising for each of the determined video segments, a step of inserting, in the information associated with each of the segments of the descriptive table, said location information for location within the digital video sequence of said at least one video portion included in the video segment.

6. A method of transmitting a video sequence representative of a digital video sequence in a communication network from a source communication apparatus to at least one recipient communication apparatus, wherein the digital video sequence is coded in a differential coding format, said digital video sequence comprising a plurality of groups of pictures (GOPs), each group of pictures being adapted to be decoded independently, the method comprising:

a step of transmitting a video sequence representative of the digital video sequence from the source communication apparatus to at least one recipient communication apparatus, the digital video sequence being divided into a plurality of digital video sections, the video sequence representative of the digital video sequence comprising a video segment for at least one digital video section, with each video segment taking into account coding of the video sequence and comprising at least one video portion, comprising a plurality of images, that is selected from the corresponding digital video section and that is located in the digital video sequence by at least one item of location information, wherein said at least one video portion includes a whole number of groups of pictures (GOPs).

7. A method according to claim 6, wherein with each video segment is associated at least one item of identification information for identification of the digital video section corresponding to the video segment.

8. A method according to claim 6, wherein said at least one item of location information is stored in the source communication apparatus.

9. A method according to claim 6, wherein said at least one item of location information is transmitted to said at least one recipient communication apparatus.

10. A method according to one of claims 6 to 9, wherein the source communication apparatus and said at least one recipient communication apparatus form a peer-to-peer network.

11. A method of transmitting video data of a digital video sequence in a communication network from a source communication apparatus to a recipient communication apparatus, wherein the digital video sequence is coded in a differential coding format, said digital video sequence comprising a plurality of groups of pictures (GOPs), each group of pictures being adapted to be decoded independently, the method comprising the following steps:
receiving at least one request from the recipient communication apparatus for obtainment of at least one portion of a video section that is complementary with respect to a segment in a video sequence that is representative of the digital video sequence and that was previously transmitted to said recipient communication apparatus, the digital video sequence being divided into a plurality of digital video sections, the video sequence representative of the digital video sequence comprising a video segment for at least one digital video section, the video segment taking into account coding of the video sequence and comprising at least one video portion, comprising a plurality of images, selected from the corresponding digital video section and located in the digital video sequence by at least one item of location information, wherein said at least one video portion comprises a whole number of groups of pictures (GOPs), and wherein said at least one complementary portion of digital video section is determined by means of the location information; and
transmitting, in response to said at least one request and for said at least one complementary portion of a requested video section, said at least one determined complementary portion.

12. A method according to claim 11, wherein with each video segment is associated at least one identifier of the digital video section corresponding to the video segment.

13. A method according to claim 11, wherein said at least one complementary portion of digital video section is determined by the source communication apparatus by means of the location information stored in the source communication apparatus.

14. A method according to claim 11, wherein said at least one complementary portion of digital video section is determined by the recipient communication apparatus by means of the location information that was previously transmitted to said recipient communication apparatus.

15. A method according to claim 11, wherein prior to the transmitting step, the method comprises a step of transcoding said at least one determined complementary portion of digital video section from a first coding format into a predetermined second coding format adapted for storage and transmission.

16. A method according to claim 11, wherein the source communication apparatus and the recipient communication apparatus form a peer-to-peer network.

17. A method of receiving video data of a digital video sequence in a recipient communication apparatus in a communication network, the video data being transmitted over the communication network by at least one source communication apparatus, wherein the digital video sequence is coded in a differential coding format, said digital video sequence comprising a plurality of groups of pictures (GOPs), each group of pictures being adapted to be decoded independently, the method comprising:
a step of receiving a video sequence representative of the digital video sequence transmitted by a source communication apparatus, the digital video sequence being divided into a plurality of digital video sections, the data representative of the digital video sequence comprising a video segment for at least one digital video section, the video segment comprising at least one video portion selected from the corresponding digital video section and located in the digital video sequence by at least one item of location information, wherein the at least one video portion comprises a whole number of groups of pictures (GOPs).

18. A method according to claim 17, wherein with each video segment is associated at least one identifier of the digital video section corresponding to the video segment.

19. A method according to claim 17, wherein the following steps are performed by the recipient communication apparatus:
selecting at least one video segment in the representative video sequence,
transmitting at least one request to at least one source communication apparatus to obtain at least one portion of a video section that is complementary with respect to a segment of the video sequence representative of the digital video sequence.

20. A method according to claim 19, wherein said at least one request comprises an item of information identifying said at least one video section corresponding to said at least one selected video segment.

21. A method according to claim 19, wherein said at least one request comprises location information for location of said at least one complementary portion of digital video section determined by means of the location information for location within the digital video sequence of the at least one video portion included in the selected video segment.

22. A method according to claim 19, comprising a step of receiving the at least one portion of the digital video section that is complementary with respect to the segment previously received by the recipient communication apparatus.

23. A method according to claim 22, comprising a step of reconstructing the requested video section on the basis of said at least one complementary portion received and of the video segment previously received and selected.

24. A method according to claim 19, wherein the recipient communication apparatus and said at least one source communication apparatus form a peer-to-peer network.

25. A device for creating a video sequence representative of a digital video sequence, wherein the digital video sequence is coded in a differential coding format, said digital video sequence comprising a plurality of groups of pictures (GOPs), each group of pictures being adapted to be decoded independently, the device comprising:

dividing means for dividing the digital image video sequence into a plurality of video sections;

selecting means for selecting at least one video portion in one of said video sections;

modifying means adapted to modify the start and end of the selected portion in order to include a whole number of groups of pictures (GOPs);

determining means for determining a video segment comprising said at least one video portion selected by said selecting means;

associating means for associating with the determined video segment at least one item of location information for location within the digital video sequence of said at least one video portion included in the segment; and inserting means for inserting the segment determined by said determining means in the video sequence representative of the digital video sequence.

26. A device according to claim 25, wherein the associating means further comprise means for associating with the determined video segment at least one item of identification information for identification of the corresponding video section.

27. A device according to claim 25, wherein the device comprises transcoding means for transcoding the segment from a first coding format to a predetermined second coding format adapted for storage and transmission.

28. A device for transmitting to at least one recipient communication apparatus a video sequence representative of a digital video sequence in a communication network, wherein the digital video sequence is coded in a differential coding format, said digital video sequence comprising a plurality of groups of pictures (GOPs), each group of pictures being adapted to be decoded independently, the device comprising transmitting means for transmitting a video sequence that is representative of the digital video sequence from the source communication apparatus to at least one recipient communication apparatus, the digital video sequence being divided into a plurality of digital video sections, the video sequence representative of the digital video sequence comprising a video segment for at least one digital video section, the video segment comprising at least one video portion selected from the corresponding digital video section and located in the digital video sequence by at least one item of location information, wherein said at least one video portion, includes a whole number of groups of pictures (GOPs).

29. A device according to claim 28, comprising storage means for storing said at least one item of location information.

30. A device according to claim 28, wherein said transmission means are for transmitting at least one item of location information to said at least one recipient communication apparatus.

31. A device for transmitting to a recipient communication apparatus video data from a digital video sequence in a communication network, wherein the digital video sequence is coded in a differential coding format, said digital video sequence comprising a plurality of groups of pictures (GOPs), each group of pictures being adapted to be decoded independently, wherein the device comprises:

receiving means for receiving at least one request from the recipient communication apparatus for obtainment of at least one portion of a video section that is complementary with respect to a segment in a video sequence that is representative of the digital video sequence and that was previously transmitted to said recipient communication apparatus, the digital video sequence being divided into a plurality of digital video sections, the video sequence representative of the digital video sequence comprising a video segment for at least one digital video section, the video segment comprising at least one video portion selected from the corresponding digital video section and located in the digital video sequence by at least one item of location information, wherein said at least one video portion includes a whole number of groups of pictures (GOPs), and wherein said at least one complementary portion of digital video section is determined by means of the location information; and transmitting means for transmitting said at least one determined complementary portion in response to said at least one received request and for said at least one complementary portion of a requested video section.

32. A device according to claim 31, comprising determining means for determining said at least one complementary portion of digital video section by means of the location information.

33. A device according to claim 31, the device comprising transcoding means for transcoding said at least one determined complementary portion of digital video section from a first coding format to a predetermined second coding format adapted for storage and transmission.

34. A device for receiving video data of a digital video sequence in a communication network, the video data being transmitted over the communication network by at least one source communication apparatus, wherein the digital video sequence is coded in a differential coding format, said digital video sequence comprising a plurality of groups of pictures (GOPs), each group of pictures being adapted to be decoded independently, wherein the device comprises receiving means for receiving a video sequence representative of the digital video sequence transmitted by a source communication apparatus, the digital video sequence being divided into a plurality of digital video sections, the data representative of the digital video sequence comprising a video segment for at least one digital video section, the video segment comprising at least one video portion selected from the corresponding digital video section and located in the digital video sequence by at least one item of location information, wherein said at least one video portion includes a whole number of groups of pictures (GOPs).

35. A device according to claim 34, comprising:

selecting means for selecting at least one video segment in the representative video sequence, transmitting means for transmitting at least one request to at least one source communication apparatus to obtain at least one portion of a video section that is complementary with respect to a segment of the video sequence representative of the digital video sequence.

36. A device according to claim 34, comprising receiving means for receiving at least one portion of the digital video section that is complementary with respect to the segment previously received by the recipient communication apparatus.

37. A device according to claim 36, comprising reconstructing means for reconstructing the requested video section on the basis of said at least one complementary portion received and of the video segment previously received and selected.

38. A non-transitory computer readable storage medium storing a program, said program containing instructions enabling the implementation of the method of creating a video sequence representative of a digital video sequence according to anyone of claims 1 to 5, when that program is loaded and run by a computer system.

39. A non-transitory computer readable storage medium storing a program, said program containing instructions enabling the implementation of the method of transmitting a video sequence representative of a digital video sequence according to anyone of claims 6 to 9, when that program is loaded and run by a computer system.

40. A non-transitory computer readable storage medium storing a program, said program containing instructions enabling the implementation of the method of transmitting video data of a digital video sequence according to anyone of claims 11 to 16, when that program is loaded and run by a computer system.

41. A non-transitory computer readable storage medium storing a program, said program containing instructions enabling the implementation of the method of receiving video data of a digital video sequence according to anyone of claims 17 to 24, when that program is loaded and run by a computer system.

42. A non-transitory computer readable storage medium storing a program, said program containing instructions enabling the implementation of the method of transmitting a video sequence representative of a digital video sequence according to claim 10, when that program is loaded and run by a computer system.

* * * * *